US006907688B2

(12) United States Patent
Brint

(10) Patent No.: US 6,907,688 B2
(45) Date of Patent: Jun. 21, 2005

(54) FLYING AND SIMULATED WOUNDED MECHANICAL BIRD DECOYS AND METHOD

(76) Inventor: George W. Brint, 3760 Forest Hill Rd., Bolivar, TN (US) 38008

( * ) Notice: Subject to any disclaimer, the term of this patent is extended or adjusted under 35 U.S.C. 154(b) by 0 days.

(21) Appl. No.: 10/696,905

(22) Filed: Oct. 30, 2003

(65) Prior Publication Data

US 2004/0107623 A1 Jun. 10, 2004

Related U.S. Application Data

(63) Continuation-in-part of application No. 10/314,479, filed on Dec. 9, 2002, now Pat. No. 6,698,132.

(51) Int. Cl.[7] .............................................. A01M 31/06
(52) U.S. Cl. ................................ 43/2; 40/417; 446/30; 472/10
(58) Field of Search ............................ 43/2, 3; 446/30, 446/228, 229; 40/414, 417, 429; 472/7, 8, 10

(56) References Cited

U.S. PATENT DOCUMENTS

| 74,458 A | | 2/1868 | Wales ................................ 43/3 |
| 278,461 A | * | 5/1883 | Screven ............................ 43/2 |
| 740,293 A | | 9/1903 | Loeble .............................. 43/3 |
| 843,588 A | | 2/1907 | Ditto ................................. 43/3 |
| 942,103 A | | 12/1909 | Rigney ............................. 43/2 |
| 1,083,882 A | | 1/1914 | Hindmarsh ....................... 43/3 |
| 1,201,839 A | * | 10/1916 | McCoole ........................ 472/27 |
| 1,224,044 A | | 4/1917 | Thurman ....................... 40/417 |
| 1,376,282 A | * | 4/1921 | Kauffman ......................... 43/2 |
| 1,385,634 A | * | 7/1921 | Marshall ......................... 472/7 |
| 1,511,044 A | * | 10/1924 | Adams .......................... 40/413 |
| 1,593,085 A | * | 7/1926 | Lang ............................. 40/413 |
| 1,652,775 A | * | 12/1927 | Funk et al. .................... 40/413 |
| 1,666,543 A | * | 4/1928 | Vincent ......................... 40/413 |
| 1,738,846 A | * | 12/1929 | Sancioni ....................... 40/413 |
| 1,746,640 A | * | 2/1930 | Emoff .............................. 43/3 |
| 1,748,421 A | * | 2/1930 | Leach ........................... 446/30 |
| 1,814,314 A | * | 7/1931 | Kane et al. ................... 40/417 |
| 1,827,775 A | * | 10/1931 | Berger ............................ 472/8 |
| 1,831,286 A | | 11/1931 | Chelini ............................ 43/3 |
| 2,028,849 A | | 1/1936 | Shay ................................ 43/3 |
| 2,174,211 A | | 9/1939 | Hutaff ............................. 43/3 |

(Continued)

FOREIGN PATENT DOCUMENTS

| DE | 226674 A1 | * 10/1910 | .................. 43/3 |
| DE | 226674 | 10/1910 | .................. 43/3 |

(Continued)

OTHER PUBLICATIONS

Cabelas Catalog p. 261 "Motion Rabbit" ad.
"Flying Dove" product package.
U.K. Patent Appl. No. 2,230,171 A Oct. 1990.
U.K. Patent Appl. No. 2,067,064 A Jul. 1981.
U.K. Patent Appl. No. 2,124,464 A Feb. 1984.

*Primary Examiner*—Darren W. Ark
(74) *Attorney, Agent, or Firm*—John M. Harrison

(57) ABSTRACT

Bird decoys for attracting predators, one of which decoys may be rotatably deployed on a rod with one wing folded, the other wing extended and both moving to simulate a wounded bird. Other embodiments include a mechanical flying bird supported on a rotating arm in a single bird flying configuration, a pair of mechanical flying birds deployed in tandem on a common rotating arm and a stacked flying bird configuration of four birds. A method for attracting predators using bird decoys which simulate dove, quail, crow, hawk, duck, geese or the like, and includes the steps of rotatably deploying a bird decoy with a folded wing on a rod or stake and causing the extended wing to flap and the folded wing to vibrate, thus simulating a wounded bird. The method also includes mounting one or more mechanical flying birds on a rotating arm or arms attached to an upright support for simulating circling of the various decoy birds in selected locations to attract predators.

6 Claims, 4 Drawing Sheets

U.S. PATENT DOCUMENTS

| | | | | |
|---|---|---|---|---|
| 2,246,132 A | * | 6/1941 | Gordon | 40/417 |
| 2,292,705 A | * | 8/1942 | Lohse | 446/30 |
| 2,357,900 A | * | 9/1944 | Lenhardt | 446/228 |
| 2,480,390 A | | 8/1949 | Thompson | 43/3 |
| 2,545,801 A | | 3/1951 | Wrazen | 46/53 |
| 2,546,189 A | * | 3/1951 | Keep et al. | 43/3 |
| 2,547,286 A | * | 4/1951 | Sabin | 43/3 |
| 2,616,200 A | * | 11/1952 | Milam | 43/3 |
| 2,624,144 A | * | 1/1953 | Beverman | 43/3 |
| 2,638,705 A | | 5/1953 | Petrasy | 40/417 |
| 2,663,108 A | | 12/1953 | Dixon et al. | 43/3 |
| 2,704,908 A | | 3/1955 | Lamkin | 40/417 |
| 2,729,022 A | * | 1/1956 | Polk | 40/417 |
| 2,747,316 A | | 5/1956 | Benedetto | 43/3 |
| 2,752,715 A | * | 7/1956 | Miller | 43/3 |
| 2,770,918 A | * | 11/1956 | Polk | 40/417 |
| 2,849,823 A | | 9/1958 | Miller | 43/3 |
| 2,953,869 A | | 9/1960 | Collischan | 43/2 |
| 3,290,817 A | | 12/1966 | Kravath | 446/227 |
| 3,292,319 A | | 12/1966 | McCarthy | 52/101 |
| 3,435,550 A | | 4/1969 | Carlson | 43/3 |
| 3,476,386 A | * | 11/1969 | Bart | 446/30 |
| 3,736,688 A | | 6/1973 | Caccamo | 43/3 |
| 3,743,279 A | * | 7/1973 | Chang | 446/30 |
| 3,762,702 A | * | 10/1973 | Keele et al. | 472/10 |
| 3,768,192 A | | 10/1973 | Caccamo | 43/3 |
| 3,869,823 A | | 3/1975 | Powers et al. | 43/3 |
| 4,135,711 A | * | 1/1979 | Holt | 472/10 |
| 4,228,977 A | | 10/1980 | Tanaka | 43/2 |
| 4,422,257 A | * | 12/1983 | McCrory | 43/3 |
| 4,432,158 A | | 2/1984 | Nicholas | 446/325 |
| 4,566,214 A | | 1/1986 | McCrory et al. | 43/3 |
| 4,611,421 A | | 9/1986 | Jacob | 43/3 |
| 4,660,313 A | * | 4/1987 | Bauernfeind et al. | 43/3 |
| 4,689,913 A | | 9/1987 | Brice | 43/3 |
| 4,817,937 A | * | 4/1989 | Ozeki | 472/10 |
| 4,893,428 A | | 1/1990 | Gagnon, Sr. | 43/3 |
| 4,896,448 A | | 1/1990 | Jackson | 43/3 |
| 4,901,458 A | | 2/1990 | Belokin et al. | 40/414 |
| 4,949,486 A | | 8/1990 | Belokin et al. | 40/414 |
| 4,965,953 A | * | 10/1990 | McKinney | 43/2 |
| D315,371 S | * | 3/1991 | Van Risseghem et al. | D21/467 |
| 5,003,722 A | * | 4/1991 | Berkley et al. | 43/3 |
| 5,102,126 A | * | 4/1992 | Nguyen | 472/10 |
| 5,144,764 A | * | 9/1992 | Peterson | 43/3 |
| 5,181,338 A | | 1/1993 | Chatten | 43/58 |
| 5,452,536 A | | 9/1995 | Chatten | 43/1 |
| 5,515,637 A | | 5/1996 | Johnson | 43/2 |
| 5,636,466 A | | 6/1997 | Davis | 43/3 |
| 5,682,702 A | | 11/1997 | McKnight et al. | 43/3 |
| 5,832,649 A | | 11/1998 | Kilgore | 43/2 |
| 5,895,893 A | | 4/1999 | McMillian | 177/126 |
| 5,926,990 A | | 7/1999 | Okimoto | 43/2 |
| 5,956,880 A | | 9/1999 | Sugimoto | 43/2 |
| 6,021,594 A | | 2/2000 | Krueger | 43/2 |
| 6,038,812 A | * | 3/2000 | Belokin et al. | 40/414 |
| 6,070,356 A | | 6/2000 | Brint et al. | 43/2 |
| 6,079,140 A | * | 6/2000 | Brock, IV | 43/3 |
| 6,092,322 A | | 7/2000 | Samaras | 43/2 |
| 6,129,606 A | | 10/2000 | Yuen | 446/325 |
| 6,212,816 B1 | | 4/2001 | Babbitt et al. | 43/3 |
| 6,216,382 B1 | | 4/2001 | Lindaman | 43/2 |
| 6,266,912 B1 | | 7/2001 | Jirele | 43/2 |
| 6,293,042 B1 | | 9/2001 | Arvanitis, Jr. | 43/3 |
| 6,349,497 B1 | | 2/2002 | Roddenbery | 43/2 |
| 6,360,474 B1 | | 3/2002 | Wurutzer | 43/3 |
| 6,374,529 B1 | | 4/2002 | Petroski et al. | 43/3 |
| 6,385,895 B1 | | 5/2002 | Scaries | 43/2 |
| 6,430,863 B1 | | 8/2002 | Krag | 43/3 |
| 6,449,894 B1 | | 9/2002 | Price, Sr. et al. | 43/3 |
| 6,493,980 B1 | * | 12/2002 | Richardson et al. | 43/3 |
| 6,572,428 B1 | * | 6/2003 | Weiser et al. | 40/417 |
| 6,574,902 B1 | | 6/2003 | Conger | 43/2 |
| 6,574,904 B1 | * | 6/2003 | Fencel et al. | 43/3 |
| 6,599,160 B2 | * | 7/2003 | Weiser et al. | 40/417 |
| 6,620,018 B1 | * | 9/2003 | Chao et al. | 446/30 |
| 6,625,919 B1 | | 9/2003 | Davis et al. | 43/3 |
| 6,698,132 B1 | * | 3/2004 | Brint | 43/2 |
| 2002/0162268 A1 | * | 11/2002 | Fulcher | 43/3 |
| 2003/0019142 A1 | | 1/2003 | Cosciani | |
| 2003/0196367 A1 | * | 10/2003 | Powell | 43/3 |
| 2003/0208944 A1 | * | 11/2003 | Olson et al. | 43/3 |

FOREIGN PATENT DOCUMENTS

| | | | | |
|---|---|---|---|---|
| DK | 200200385 A1 | * | 9/2003 | |
| EP | 1279333 | | 1/2003 | |
| EP | 1279333 A2 | * | 1/2003 | |
| FR | 848634 | | 3/1939 | 43/3 |
| FR | 848634 A1 | * | 11/1939 | 43/3 |
| FR | 2646588 A1 | * | 5/1989 | |
| FR | 2646588 | | 11/1990 | |
| FR | 2671691 A1 | * | 7/1992 | 43/2 |
| FR | 2671694 A1 | * | 7/1992 | |
| GB | 389522 | | 3/1933 | 43/2 |
| GB | 406386 | | 3/1934 | 43/2 |
| GB | 611844 | | 11/1948 | 43/2 |
| GB | 966386 | | 8/1964 | 43/2 |
| GB | 2067064 A1 | * | 7/1981 | |
| GB | 2124464 A1 | * | 2/1984 | |
| GB | 2230171 A1 | * | 10/1990 | |
| IT | 262806 | | 2/1929 | 43/2 |
| IT | 471206 | | 8/1952 | 43/2 |
| IT | 624517 | | 7/1961 | 43/3 |
| SE | 129808 | | 10/1950 | 43/2 |

* cited by examiner

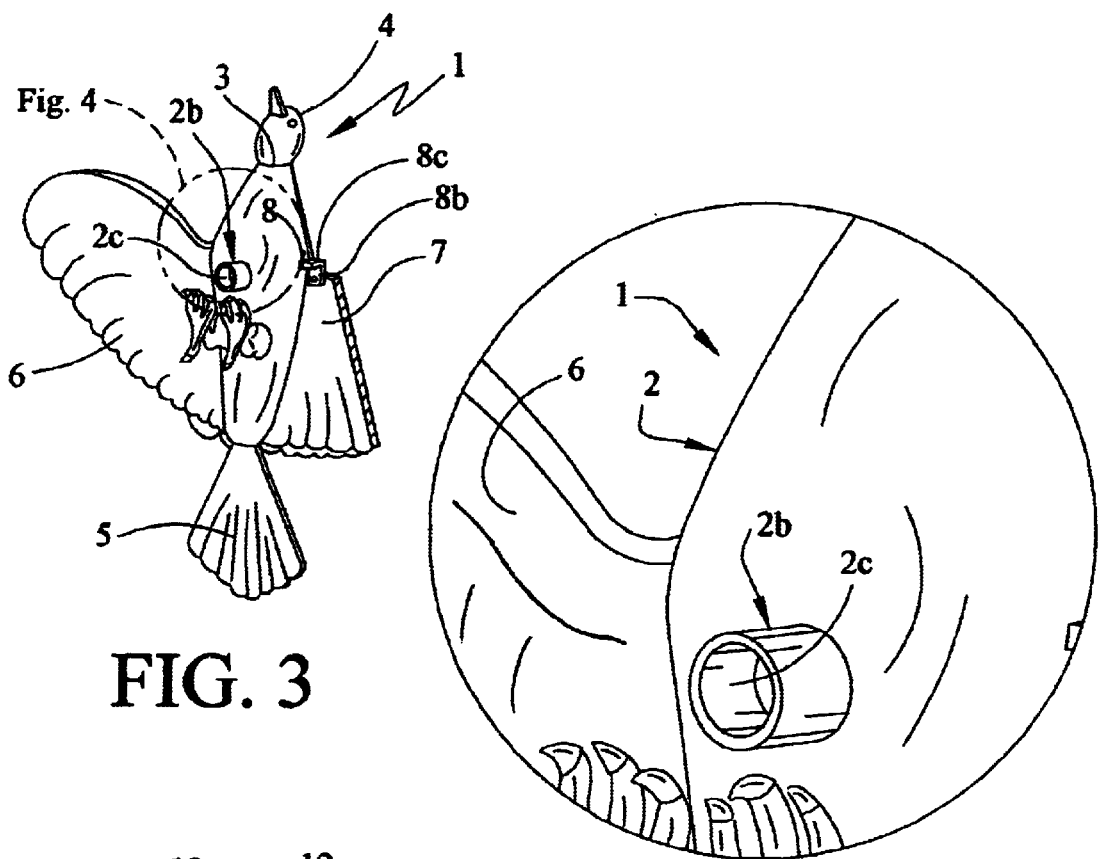
FIG. 3
FIG. 4
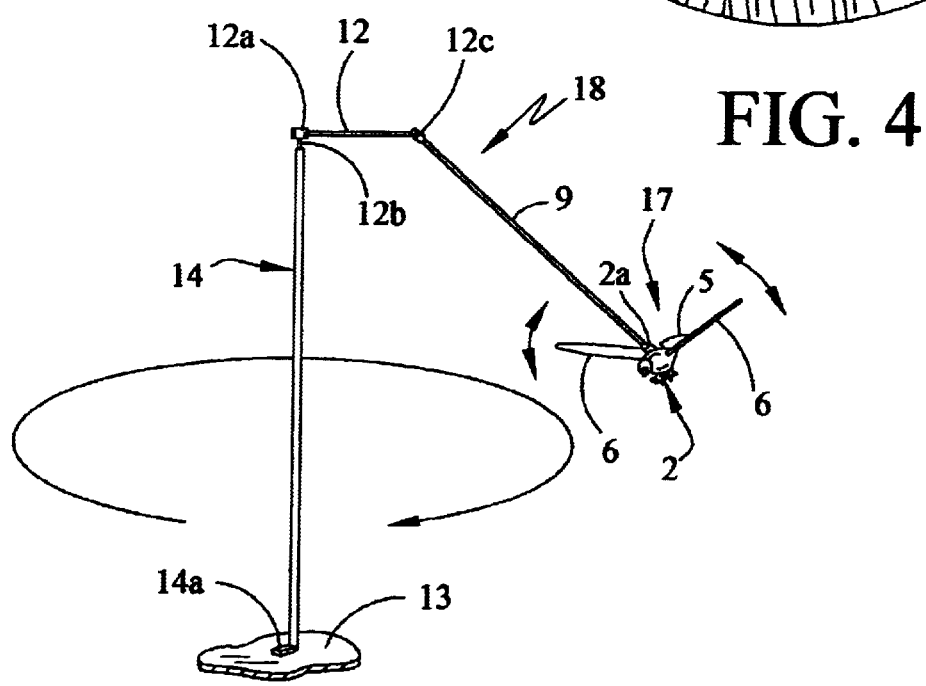
FIG. 5

US 6,907,688 B2

FLYING AND SIMULATED WOUNDED MECHANICAL BIRD DECOYS AND METHOD

CROSS-REFERENCE TO RELATED APPLICATIONS

This continuation-in-part application claims the benefit of my prior application Ser. No. 10/314,479, filed Dec. 9, 2002 now U.S. Pat. No. 6,698,132.

SUMMARY OF THE INVENTION

This invention relates to decoys for use by hunters and photographers and more particularly, to folded wing and mechanical flying bird decoys and a method of using the bird decoys for attracting typically North American predators such as coyotes, bobcats, fox, wolves, bear and the like, as well as migratory birds such as waterfowl, crow and dove, and the like. In a preferred embodiment a lightweight flying bird decoy that simulates a migratory, forager, predator or waterfowl bird having a decoy body, is typically supported or deployed on a rod or stake with one wing folded to vibrate and the other extended to flap and simulate a wounded bird. In another embodiment one or more mechanical flying birds are suspended, typically by means of monofilament fishing line, from a rotating arm or arms, connected to a stake or pole of selected height to impart life-like movements of the flying decoy birds when the wings flap in an up and down motion and fly the bird(s) around the stake or pole without the necessity of an auxiliary propulsion system.

In the folded wing decoy embodiment the bird decoys are configured in the shape of a dove, quail, crow, hawk, goose or the like, and are supported on an upright stake, dowel, pole or rod, individually by means of a cylinder or cup-shaped receptacle attached to the body, with one wing folded and vibrating and the other wing flapping, by operation of a battery-operated, on-board electric motor, to rotate the bird around the stake and simulate struggling of a wounded bird.

In a second embodiment a mechanical flying bird decoy is suspended from a rotating arm carried by a vertical rod or stake to simulate a single bird flying in the area. In still another embodiment of the invention a pair of mechanical flying birds are suspended by monofilament line from opposite ends of a common rotating arm in oppositely-disposed configuration to simulate two birds flying. In still another preferred embodiment of the invention this tandem pair of mechanical flying birds is augmented by a second pair of flying bird decoys disposed in flying orientation above the first pair on a jointed stake or pole suspended from a second rotating arm. In all of the latter embodiments the mechanical birds actually fly by operation of an on-board electric motor to effect flapping of the wings without the necessity of any other external propulsion force applied to the rotating arm or arms.

BRIEF DESCRIPTION OF THE DRAWINGS

The invention will be better understood by reference to the accompanying drawings wherein:

FIG. 3 is a perspective view of underside of the folded wing bird decoy illustrated in FIGS. 1 and 2, more particularly illustrating a preferred cylindrical receptacle for receiving the extending upward-standing end of the rod illustrated in FIGS. 1 and 2 and facilitating rotation of the bird with respect to the rod with one wing folded and vibrating and the other extended and flapping.

FIG. 4 is an enlarged view of the cylindrical rod-receptacle provided on the underside of the folded wing bird decoy illustrated in FIG. 3;

FIG. 5 is a perspective view of a flying bird decoy suspended from one end of a rotatable arm, typically by means of a monofilament fishing line, which arm is rotatably attached to an upright stake pole or rod and rotates responsive to the flying action of the flying bird decoy;

DESCRIPTION OF THE PREFERRED EMBODIMENTS

Figure 1:
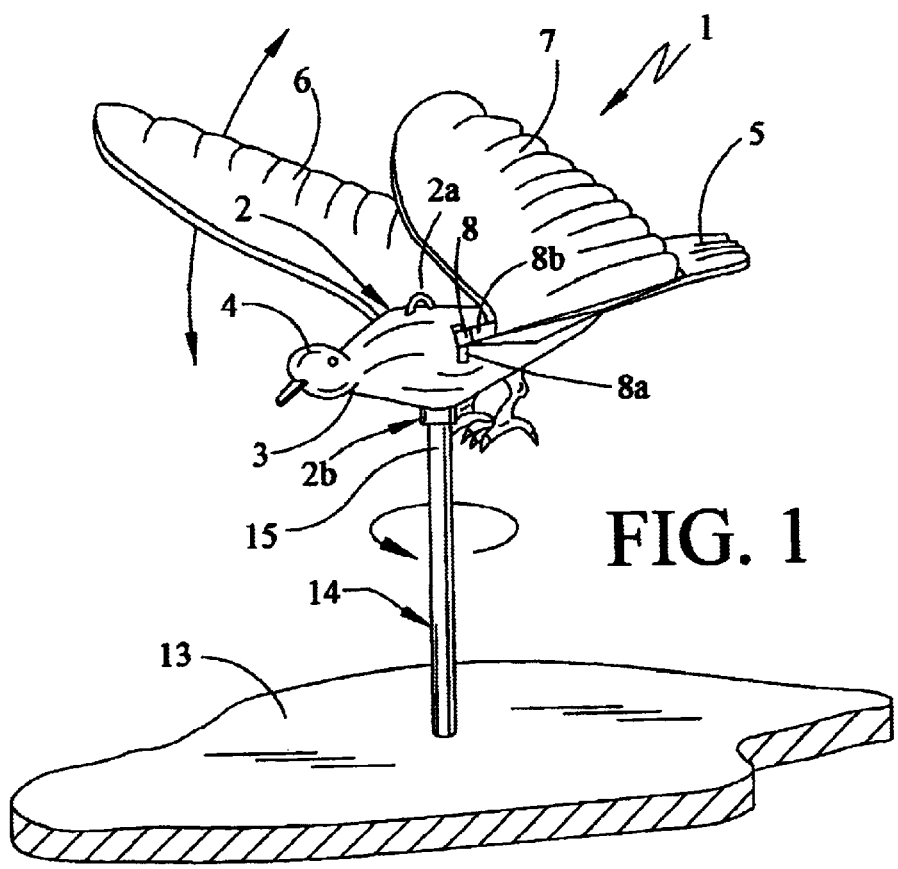
FIG. 1 is a perspective view of a folded wing bird decoy attached to an upright stake, dowel, pole or rod with one wing of the decoy extended to flap and the other folded to vibrate and simulate a distressed or wounded configuration, as both wings are operated to rotate the bird around the stake.
Figure 2:
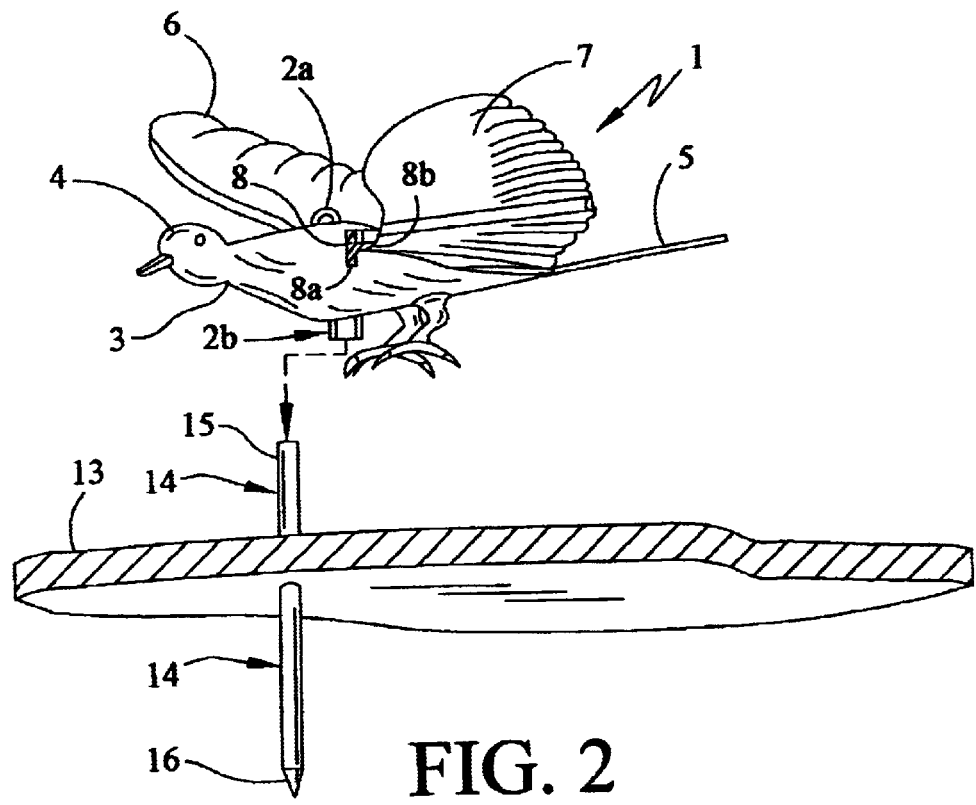
FIG. 2 is a perspective exploded view of the folded wing bird decoy illustrated in FIG. 1, more particularly illustrating a preferred cup or receptacle for removably and rotatably mounting the folded wing bird decoy on the rod.

Referring initially to FIGS. 1–4 of the drawings a folded wing mechanical bird decoy is generally illustrated by reference numeral 1 and includes a decoy body 2, which may typically be shaped and colored to simulate a migratory and/or foraging bird such as a dove, quail, crow or predator, including hawks, owls and/or waterfowl, such as a duck or goose, in non-exclusive particular. A neck 3 extends from the decoy body 2 and is terminated by a head 4, typically shaped to resemble one of the above innumerated birds, as desired. Simulated tail feathers 5 also project from the opposite end of the decoy body 2 from the head 4 and an extended wing 6 and folded wing 7 are each hingedly or pivotally attached to the decoy body 2 at the leading edges thereof by means of a wing mount 8, connected to an electric motor (not illustrated) and extending through a wing slot 8a. The wing mount 8 is attached to a wing plate 8b at a wing pivot pin 8c (FIG. 3) in a conventional wing-folding and retracting manner. Accordingly, although the wing 6 was designed to fold in the same manner as the folded wing 7 to facilitate more optimum packaging and shipping of the conventional bird, it has surprisingly been found that one wing 6 can be extended to flap in a simulated flying configuration as hereinafter described and the folded wing 7 folded to vibrate, as illustrated in FIGS. 1 and 2, for purposes which will be hereinafter described. In flying configuration, the extended wings 6 are designed to flap up and down as indicated by the arrow, responsive to the operation of the small, battery-powered electric motor (not illustrated) located inside the decoy body 2 and geared to the wing pins 8. Accordingly, the bird decoy may be of the flying design, as in the flying bird decoy 17 hereinafter described regarding FIGS. 5–7, or it may be designed such that only one of the wings 6 flap up and down in a simulated flying action, while the other folded wing 7 vibrates, as in the folded wing decoy 1 illustrated in FIGS. 1–4.

The folded wing bird decoy 1 can be positioned and configured in a simulated injured and/or distressed configuration by folding the folded wing 7 and allowing the extended wing 6 to extend and flap while the folded wing 7 vibrates, as illustrated in FIGS. 1 and 2, which action surprisingly causes the folded wing decoy 1 to rotate around the support rod 14, as further illustrated in FIGS. 1 and 2. A body receptacle or pivot 2b is molded with or otherwise provided on the underside of the folded wing decoy 1, as illustrated in FIGS. 3 and 4, to facilitate positioning the folded wing decoy 1 on the mount end 15 of the support rod 14 and cause rotation of the folded wing decoy 1 around the support rod 14 when the folded wing 7 is in folded, vibrating configuration and the extended wing 6 is extended and flapping, both by operation of the electric motor. It will be appreciated by those skilled in the art that the support rod 14 can be of any desired length and shape, typically having a sharp or pointed end 16, that facilitates easy insertion into the ground 13, as indicated. Alternatively, any other desired fixed or rotatable connection between the decoy body 2 and the support rod 14 can be used, according to knowledge of those skilled in the art.

Figure 6:
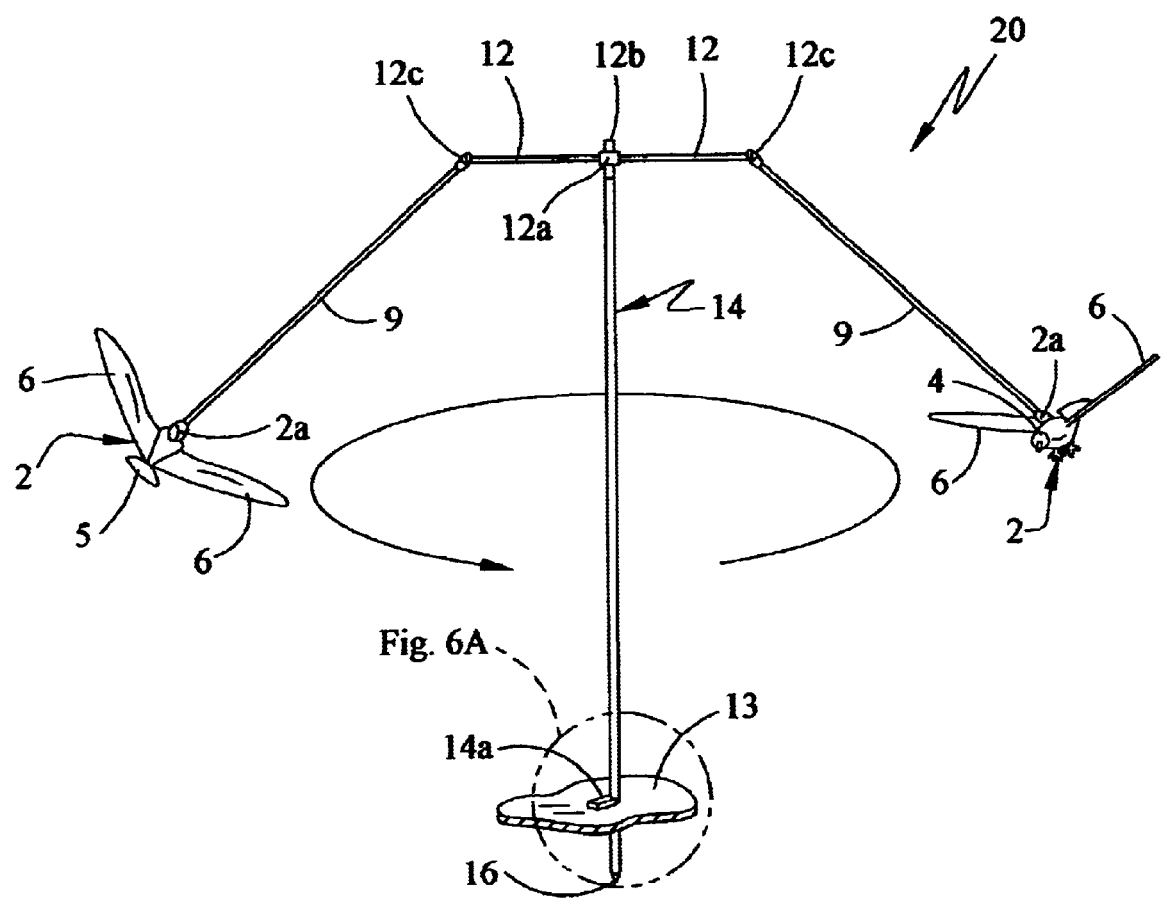
FIG. 6 is a perspective view of a pair of mechanical flying birds, each suspended from one end of a common rotating arm attached to an upright rod and flying in a self-propelled motion around the rod.
Figure 6A:
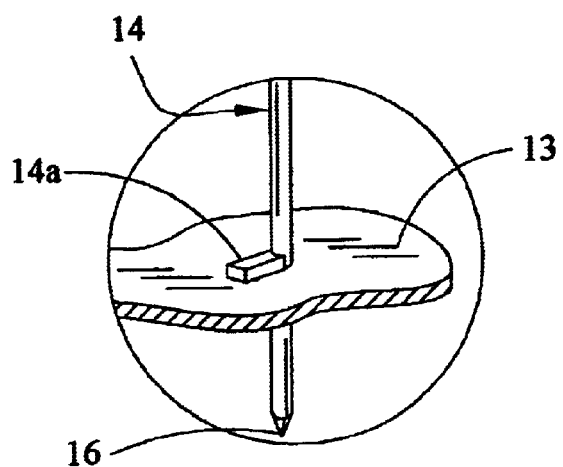
FIG. 6A is a perspective view of a convenient rod foot attached to the upright pole or rod for driving the stake into the ground by foot and leg pressure.

Referring now to FIGS. 5 and 6A of the drawings, a mechanical flying bird decoy 17 can be attached in a single bird mount 18, typically by means of a knot in the suspension line 9, to a body hook 2a provided on the decoy body 2, and typically at the opposite end to a rotating arm 12. The rotating arm 12 is fitted with an arm bearing 12a typically mounted on an upward-standing arm bearing pin 12b and designed to receive the mounted end of the rotating arm 12. An arm ring 12c may also be provided on the extending outer end of the rotating arm 12 to facilitate securing the opposite end of the suspension line 9, which may be typically be relatively invisible, clear monofilament line or the like. The arm bearing 12a is positioned on the upper end of a support pole or rod 14 of selected height and typically having a rod foot 14a (FIG. 6A) extending from near the bottom thereof to facilitate forcing the support rod 14 into the ground at the sharp end 16. Accordingly, as further illustrated in FIG. 5, when the extended wings 6 of the flying bird decoy 17 are operated by means of the internal, on-board electric motor (not illustrated) therein, the flying bird decoy 17 will fly on its own propulsion around the support rod 14 on the suspension line 9 as the rotating arm 12 freely rotates with this propulsion, to simulate the flying motion of a real bird at a selected height above the ground 13.

Referring now to FIG. 6 of the drawings, a double bird mount 20 is illustrated, with a pair of mechanical flying bird decoys 17 suspended by means of corresponding suspension lines 9 from opposite rotating ends of a common rotating arm 12, attached in rotatable fashion to a support rod 14, typically by means of an arm bearing 12a and arm bearing pin 12b. As in the case of the support rod 14 illustrated in FIG. 5, the support rod 14 is typically characterized by a rod foot 14a and a sharp end 16 to facilitate easy driving of the sharp end 16 into the ground, as illustrated in FIG. 6A. The oppositely-disposed flying bird decoys 17 equalize the weight on the rotating arm 12 and this configuration facilitates a smooth rotation of the rotating arm 12 on the arm bearing 12a.

Figure 7:
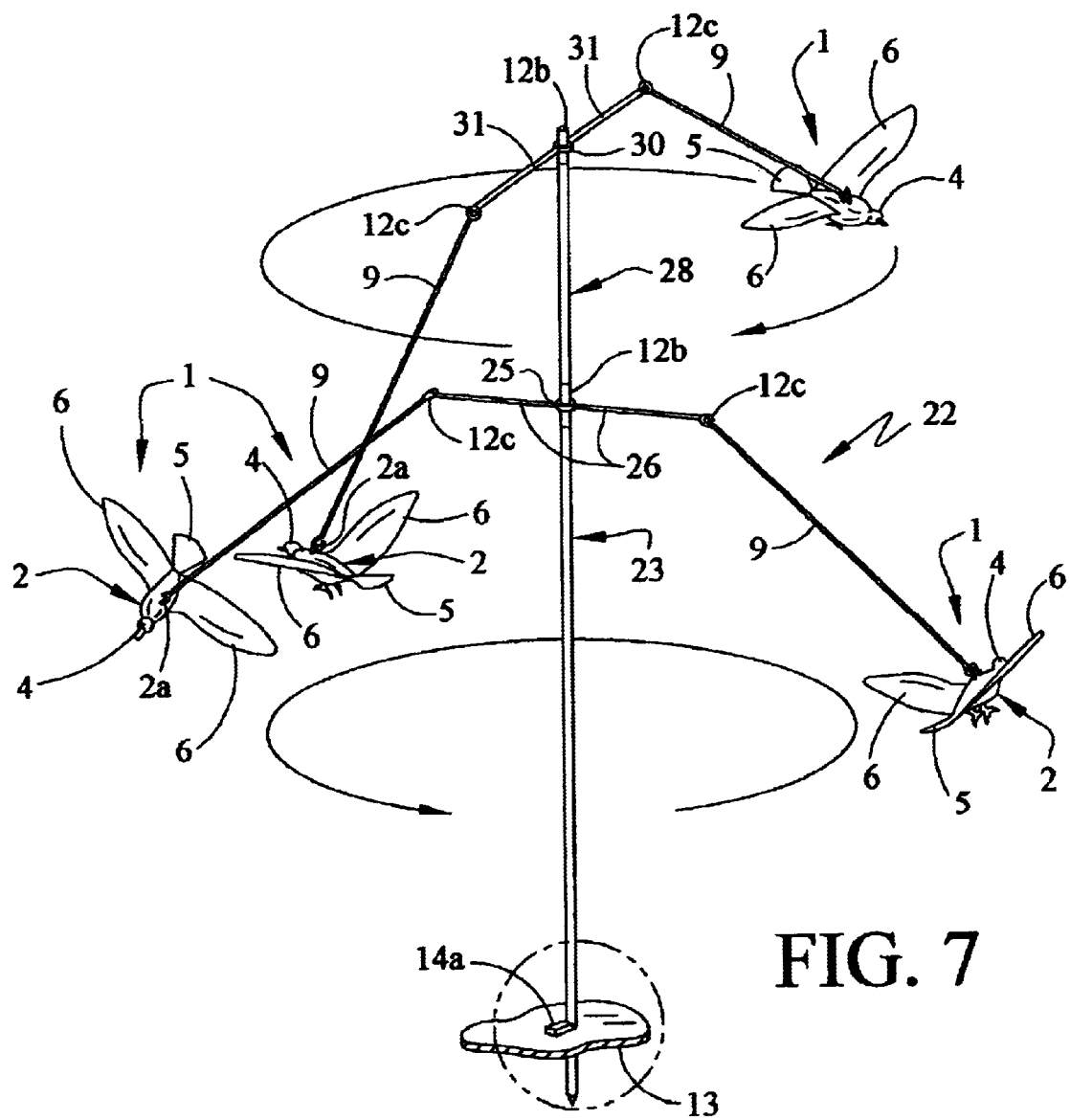
FIG. 7 is a perspective view of two stacked sets or pairs of mechanical flying birds suspended from corresponding, vertically spaced-apart rotating arms attached to a common upward-standing rod or a pair of connected rod segments.
Figure 7A:
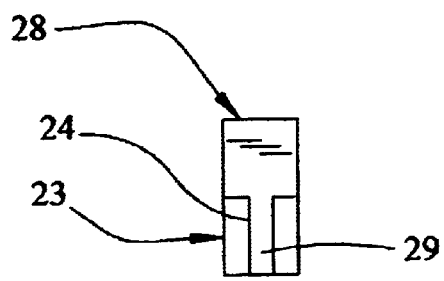
FIG. 7A is an enlarged sectional view of a preferred rod segment attachment to connect the composite rod illustrated in FIG. 7.

As illustrated in FIG. 7 of the drawings, in another preferred embodiment of the invention a stacked double bird mount 22 is illustrated, wherein a pair of flying bird decoys 17 are mounted essentially as illustrated in FIG. 6 and a second pair of flying bird decoys 17 are mounted above the first pair, typically utilizing a bottom support rod 23 and a top support rod 28 that may be removably attached to each other, typically as illustrated in FIG. 7A. A bottom support rod receptacle 24 is typically shaped in the top end of the bottom support rod 23 and a corresponding receiving top support rod pin 29 fits snugly into the bottom support rod receptacle 24, as illustrated. A bottom support rod bearing 25 is mounted on the bottom support rod 23 in any suitable fashion, and typically on an arm bearing pin 12b and rotatably mounts a corresponding bottom rotating arm 26, while a top support rod bearing 30 is also typically seated on another arm bearing pin 12b and rotatably mounts a top rotating arm 31 above the bottom rotating arm 26. A first pair of flying bird decoys 17 is suspended from the bottom rotating arm 26 by means of corresponding suspension lines 9, while a second pair of flying bird decoys 17 is suspended from the rotating ends of the top rotating arm 31 by additional suspension lines 9, in similar fashion to the embodiment illustrated in FIG. 6.

It will be appreciated by those skilled in the art that the folded wing decoy 1 and the flying bird decoys 17 of this invention, in all of the embodiments illustrated in the drawings, are designed to utilize the up and down flapping motion of the extended wings 6 (FIGS. 5–7) or the simulated injury movement or vibration of a folded wing 7 and the flapping of the opposite wing 6 in distressed configuration (FIGS. 1–4), to attract a predator such as a coyote, bobcat, fox, wolf, bear or the like. It will be further appreciated that the bird decoys, in all variations, can be configured by injection-molding or other plastic-shaping techniques in appropriate colors and body, wing and feather design, according to the knowledge of those skilled in the art to simulate migratory and/or foraging birds such as dove, quail and crows; predator birds including hawks and owls; and waterfowl such as ducks and geese, in non-exclusive particular.

In use, the bird decoys, including the folded wing decoy 1 and the flying bird decoys 17 and the necessary support and deployment elements can be quickly and easily carried to the hunting or photography site, where the bird decoy or decoys may be quickly and easily positioned on the support rod 14, in the case of the folded wing decoy 1 illustrated in FIGS. 1–4, or attached to a single support rod 14 as illustrated in FIG. 5 and flown on their own power in single or tandem flying configurations, as illustrated in FIGS. 5, 6 and 7. Furthermore, the largest assembly of flying bird decoys 17 can be deployed by using the bottom support rod 23 and top support rod 28 in the stacked configuration illustrated in FIG. 7 to facilitate flying at least four flying bird decoys 17 at one time. Additional mechanical birds can be added, both in stacked configuration and to additional rotating arm extensions, as desired.

In a preferred embodiment of the invention each suspension line 9 is typically characterized by a length of clear monofilament fishing line of small diameter to reduce the visibility of the respective connections between the flying bird decoys 17 and the corresponding rotating arms. Moreover, the rotating arm 12, bottom rotating arm 26, and the top rotating arm 31 can be constructed with a low or thin profile of any selected length and may typically be constructed of material such as fiberglass, plastic, including transparent plastic, metal or the like in non-exclusive particular, and may also be fitted with the indicated arm ring 2c, for attaching the suspension line(s) 9, as desired.

While the preferred embodiments of the invention have been described above, it will be recognized and understood that various modification may be made in the invention and the appended claims are intended to cover all such modifications which may fall within the spirit and scope of the invention.

Having described my invention with the particularity set forth above, what is claimed is:

1. A flying bird decoy comprising a substantially vertically-oriented support; at least one arm rotatably carried by said support; at least one suspension line attached at one end to the at least one arm; and at least one self-propelled mechanical flying bird connected to the other end of said at least one suspension line to thereby connect said at least one self-propelled mechanical flying bird to and suspend said at least one self-propelled mechanical flying bird from said at least one arm, said at least one self-propelled mechanical flying bird having a motor therein and a pair of movable wings connected to said motor, for circling said support on said at least one arm responsive to up and down flapping of said movable wings by operation of said motor and flying of said at least one self-propelled mechanical flying bird.

2. The flying bird decoy of claim 1 comprising a bearing provided on said support for receiving said at least one arm and wherein said at least one arm rotates around said support on said bearing responsive to said flying of said at least one mechanical flying bird.

3. The flying bird decoy of claim 1 wherein said at least one mechanical flying bird comprises two mechanical flying birds, each of said mechanical flying birds being attached to a respective end of said at least one arm.

4. The flying bird decoy of claim 3 comprising a bearing provided on said support for receiving said at least one arm and wherein said at least one arm rotates around said support on said bearing responsive to said flying of said mechanical flying birds.

5. The flying bird decoy of claim 1 wherein said at least one arm comprising a pair of arms disposed in vertically spaced-apart relationship with respect to each other and rotatable on said support, and said at least one mechanical flying bird comprising a first pair of mechanical flying birds attached to one of said pair of arms and a second pair of mechanical flying birds attached to said second pair of arms.

6. The flying bird decoy of claim 5 comprising bearings provided on said support for receiving said arms and wherein said arms rotate around said support on said bearings, respectively, responsive to said flying of said first and second pair of mechanical flying birds, respectively.

* * * * *